Sept. 9, 1941.  E. H. GREIBACH  2,255,249
VOICE TRANSLATING APPARATUS
Filed Aug. 12, 1938  2 Sheets-Sheet 2

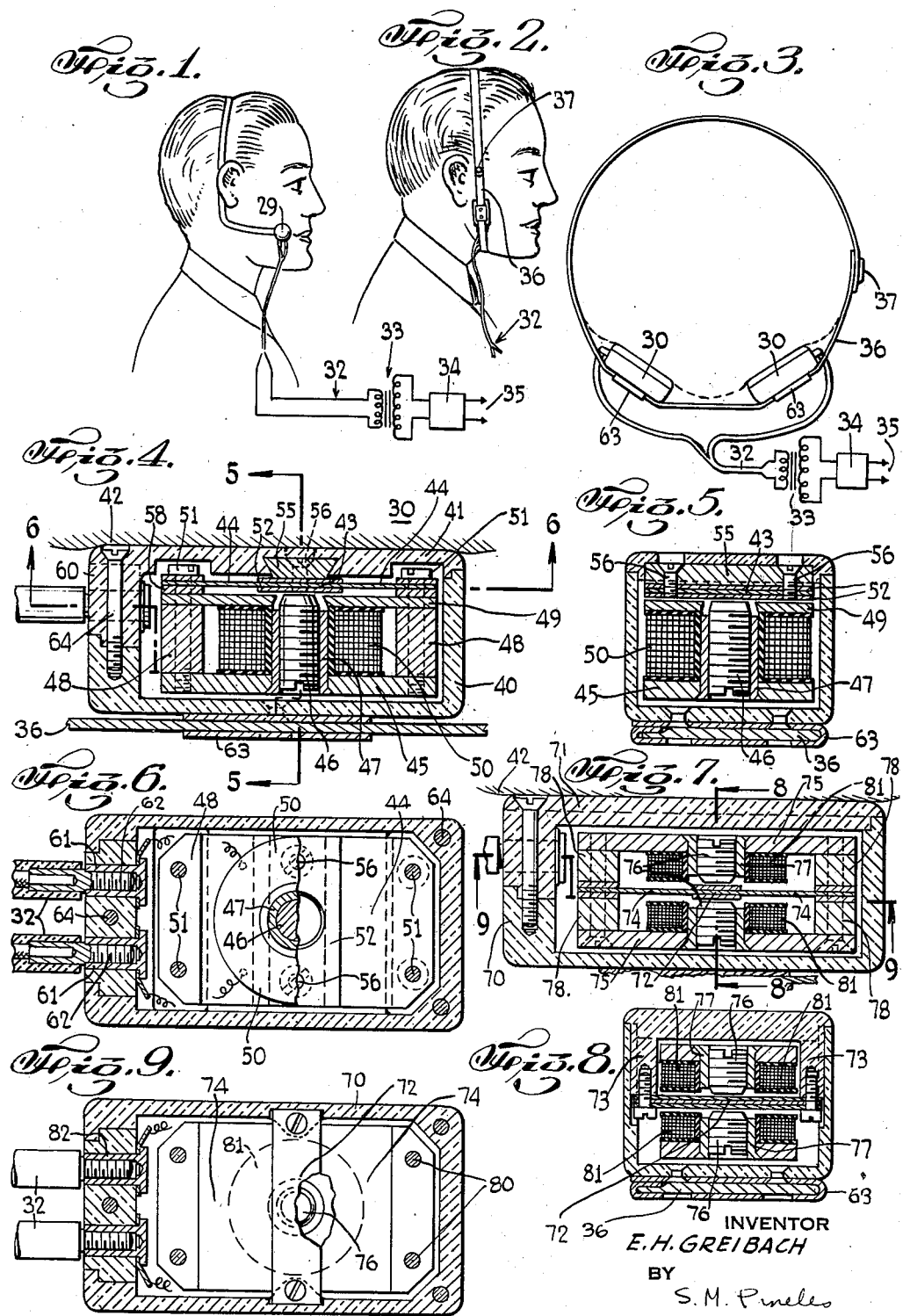

INVENTOR
E. H. Greibach
BY J. Michael Pineles
ATTORNEY

Patented Sept. 9, 1941

2,255,249

UNITED STATES PATENT OFFICE 2,255,249

VOICE TRANSLATING APPARATUS

Emil H. Greibach, Brooklyn, N. Y.

Application August 12, 1938, Serial No. 224,446

13 Claims. (Cl. 179—121)

This application is a continuation in part of my copending application Serial No. 8,585 filed February 28, 1935, and some of the features of the present invention are disclosed in my copending application Serial No. 697,673 filed November 11, 1933, upon which Patent No. 2,127,468 was granted on August 16, 1938, reissued as Reissue 21,030 on March 14, 1939.

This invention relates to voice translating apparatus and more particularly to apparatus for translating the vibrations of a voice organ of a person into electric oscillations required for intelligibly reproducing his speech while preventing sound propagated in the surrounding air from detrimentally affecting the operation of the microphone.

Among the objects of the invention is a voice translating apparatus utilizing a self generating vibratory casing microphone of small total mass having a sound proof rigid casing that constitutes a part of an elastically deformable vibratory structure resiliently carried on the interior of the casing and arranged to produce under the action of vibrations imparted to the casing by a speech organ against which the casing is held a vibratory motion between the resiliently carried and casing portions so as to generate by said vibratory motion electric oscillations required for reproducing a speech.

The foregoing and other objects of the invention will be best understood from the following description of exemplifications of the invention as illustrated in the accompanying drawings in which Figs. 1 to 3 are views illustrating different ways for holding the vibratory microphone casing of the invention in contact with a vibratory speech organ of a speaker;

Fig. 4 is an enlarged sectional view of a vibratory casing microphone exemplifying one form of the invention; Figs. 5 and 6 are vertical and horizontal views respectively along lines 5—5 and 6—6 of Fig. 4;

Figs. 7, 8 and 9 are views similar to Figs. 4, 5 and 6 illustrating another exemplification of the invention;

Figure 15:
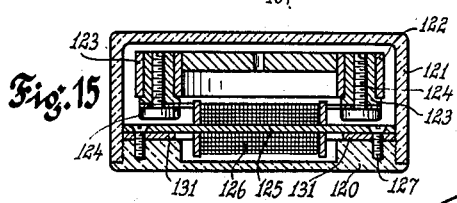
Figure 16:
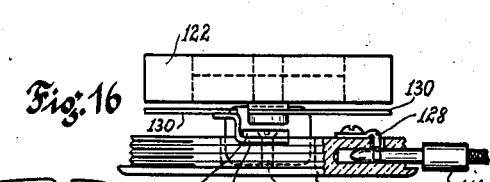
Figure 17:
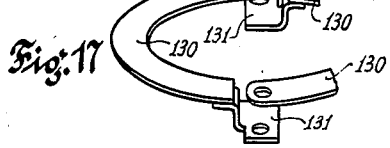

Figs. 15 and 16 are views similar to Figs. 4 and 5, respectively, illustrating a further exemplification of the invention; and Fig. 17 is a perspective view of the spring support of the device shown in Figs. 15 and 16.

There are many instances requiring microphones which are able to utilize the vibrations of a speech organ for reproducing speech with a high degree intelligibility while preventing noise or other sounds propagated in the surrounding air from detrimentally affecting the operation of the microphone. For instance, in case of an aeroplane pilot trying to communicate with a ground station, it is important to have a microphone which will enable him to transmit a spoken message without interference by the surrounding noise.

It is well known that speech is produced by the effect which the vocal cords of the larynx, the tongue, the lips and the cavities of the throat, nose and mouth, exert on the stream of air discharged by the lungs through the mouth of the speaker. The resultant speech wave with its component frequencies emerging from the mouth of the speaker reacts on the various speech organs, and the vibrations of the individual speech organs contain to some extent the principal component frequencies required for intelligible reproduction of speech.

The invention solves this problem by a self generating contact microphone of small mass constructed in the form of a substantially rigid sound proof contact casing arranged to be held in contact with or carried by a vibrating speech organ of the speaker and forming a part of an energy translating vibratory structure having a vibratory portion resiliently carried within the casing in a driven vibratory condition so as to exert under the action of the vibrations imparted to the contact casing sufficient inertia reaction for generating by the resulting relative vibratory motion between the contact casing portion and the resiliently carried driven vibratory mass portion electric oscillations required for intelligibly reproducing the speech vibrations transmitted from the mouth of the speaker without modifying the characteristic speech frequency vibrations of the organ with which it is in contact.

The contact casing microphone of the invention is formed of an elastically deformable energy translating vibratory structure comprising a rigid sound proof casing portion and a vibratory mass portion resiliently carried within the casing. The contact casing portion and the internal resiliently carried vibratory structure are designed and arranged to have a small total mass held in contact with, or carried by, a vibrating voice organ, such as the face, the cheeks, lips or throat, so as to be vibrated by such organ without substantially modifying the character of the vibrations of such organ by the added microphone mass engaging the voice organ.

The encased vibratory structure is designed to translate the vibratory motion imparted to the casing portion into electric oscillations in accordance with the difference in the velocity between the resiliently carried vibratory mass portion and the contact casing portion of the vibratory structure.

Under the action of low frequency vibrations of a voice organ imparted to such contact casing microphone, the inertia reaction forces of the resiliently carried interior vibratory mass will be negligible and its relatively stiff resilient support will offer large resistance to deflection. As a result, the interior resiliently carried vibratory mass will move substantially in unison with the casing, and the relative velocity between the casing portion and resiliently carried portion of the vibratory structure will be negligible. Accordingly, only a negligibly small voltage will be generated under the action of low frequency vibrations imparted to the microphone casing, even if the amplitude of these low frequency vibrations is relatively large.

As the frequencies of the vibrations imparted to the microphone casing rise, the inertia reaction of the interior resiliently carried mass increases, and the resistance of the resilient support against deflection decreases. As a result, the relative velocity between the casing portion and the interior resiliently carried mass portion increases with the rising frequencies, until at very high frequencies the interior resiliently carried mass is substantially stationary and the entire velocity imparted by the speech organ to the microphone casing is utilized to generate a relatively large high-frequency voltage output.

I have found that such inertia reaction casing contact microphones of the electromagnetic or electrodynamic type are particularly effective for the intelligible reproduction of speech, because the magnitude of the generated voltage is proportional not to the difference in the displacement between the resiliently carried inner vibratory portion and the outer contact casing portion, but to the difference in their velocities, giving, as a result, a response which rises with the frequency not at a linear, but at a substantially square rate. As distinguished therefrom, inertia reaction microphones in which the magnitude of the generated voltage is determined by the difference in the displacement between the resiliently carried portion and the contact portion are less effective for such applications, because the generated voltage rises only linearly with the frequency.

A velocity-type self-generating inertia reaction casing microphone having an over all size small enough for holding it in the mouth cavity, similar to a piece of chewing gum, may be readily designed to generate output voltages required for reproducing the speech emerging from the mouth of the speaker with a high degree of intelligibility while using only a standard amplifier. Such microphone is very efficient when it is operated while held by an external support in contact with the vibrating portions of the face, cheeks, lips, jaw or the throat, and it will under the vibrations imparted by such organ supply relatively large output voltages which will enable highly intelligible reproduction of the speech emerging from the mouth of the speaker.

Thus, as shown in Fig. 1, a circular vibratory casing microphone 29 of the invention may be held by a light head band 31 in contact with a vibrating cheek portion of the speaker, the output leads 32 from the microphone being connected through a step up transformer 33 to the input side of an amplifier 34, the output leads 35 which are connected either to a receiver or to a modulating stage of a radio transmitter, for transmitting a radio message from an aeroplane, for instance. As shown in Fig. 2, a rectangular vibratory casing microphone 30 of the invention, may be held in contact with a vibrating cheek portion of a speaker by an elastic strap 36 of light flexible material extending over the top of the head and below the chin, the ends of the strap 36 being held together by a snap fastener 37, for instance. As shown in Fig. 3, two rectangular vibratory casing microphones 30 of the invention may be held in contact with the vibrating throat portions overlying the larynx by a strap 36, the ends of which are joined by a snap fastener 37, as in Fig. 2, the two microphones supplying their combined output to the amplifier 34.

Such rising frequency characteristic, small self generating vibratory casing microphone has rising frequency characteristics, and such microphone unit of an overall mass of only about 20 grams, which is so light that it does not materially suppress or modify the vibrations of the speech organ against which it is held, will reproduce the speech of the speaker with a very high degree of intelligibility if the resiliently carried vibrating structure is designed to have a resonance frequency of about 1250 cycles. However, the rising frequency characteristic, and the protective casing arrangement make it possible to design the encased vibratory microphone structure of the invention to operate with any desired higher resonance frequency suitable for generating under the vibrations imparted by a speech organ an output voltage that will enable intelligible reproduction of speech. By damping the vibratory motion of enclosed vibratory structure the response in the high frequency region is greatly improved. Since the vibrating structure is entirely encased, a damping medium, such as oil, may be placed in the casing so as to give the desired damping effect, and the enclosing casing may be made liquid tight so as to prevent leakage of the damping liquid.

One distinct advantage of the inertia reaction casing microphone of the invention resides in the elimination of all shielding problems. By constructing such vibratory casing microphone as an electromagnetic vibratory structure, its impedance may be made so low as to leave it unaffected by any stray fields interlinked with the microphone structure. If such self generating casing microphone is constructed as a vibrating structure having a high internal impedance, it may be easily given complete protection against disturbing stray fields, by utilizing the casing itself as a shield, for instance, by providing its surface with a layer of shielding metal.

In Figs. 4 to 6 is shown an electromagnetic contact casing microphone 30 exemplifying the invention constructed along the lines of the device described in connection with Figs. 2 to 4 of my copending application Serial No. 697,673 filed November 11, 1933, on which Patent Reissue 21,030 was granted.

It comprises a small rigid sound proof enclosure formed of a casing 40 having a base 41 and arranged to be held pressed in contact with a portion 42 of a vibratory speech organ of a speaker so that the casing 40 vibrates substantially in unison with the speech organ.

The vibratory microphone casing 40 is a part of an electromagnetic vibratory structure mounted in the interior of the casing 40. It comprises a magnetic armature core portion 43 which is clamped to the base 41 and carries on resilient magnetic diaphragm extensions 44 a magnetic core system formed of a magnetic core bar 45, having a central core pole piece 46 threadedly held within a core sleeve 47 fixed within an opening of the core bar 45, two core blocks 48 and a magnetic pole plate 49 clamped to the ends of the diaphragm 44 completing the resiliently carried core system.

An output coil 50 surrounding the core sleeve 47 and the pole piece 46 is interlinked with the magnetic flux through the pole piece 46.

The resiliently carried core system has a permanently magnetized portion which produces a permanent flux through the soft iron pole piece 46 and therefrom over the main magnetic gap to the facing portion of the armature 43, the flux path being completed over the armature by way of the pole plate 49 and the armature extensions 44 to the core blocks 48 of the floating core system.

The clamped portion of the armature 43 is made rigid, for instance, by soldered or otherwise uniting strips 52 of magnetic material into a rigid armature member held clamped to an anchor bar 55 within the base 41 by means of two screws 56. The end portions of the armature diaphragm 44 are likewise stiffened by metal strips soldered or brazed to the diaphragm ends which are clamped to the resiliently carried core structure by means of screws 57 over underlying spacer shims 58.

One end of the base is provided with a projecting terminal block 60 in which are mounted terminal bushings 61 connected to the ends of the output coil 50, the bushings having threaded holes for receiving terminal tips 62 of the core leads 32 to the amplifier. The base is firmly clamped to the casing 40 by means of bolts 64. To the outer wall of the casing 40 is secured, as by riveting, a U-shaped metal clamp 63 for clamping the supporting strap 36 with which the casing microphone is held clamped to a vibrating speech organ.

Under the action of the vibratory motion imparted to the microphone casing by a vibrating speech organ held coupled thereto, a relative vibratory motion across the main magnetic pole gap is produced between the casing core portion 43 and the mass of the resiliently carried magnetic core within the casing. The resulting variations in the flux density through the pole gap will induce in the output coil 50 interlinked with the flux path voltages corresponding to the effect of the relative motion between the armature 43 and the resiliently carried magnetic core.

A mathematical analysis shows that the approximate general equation of the voltage E generated in an inertia reaction velocity microphone of the type illustrated in Figs. 4 to 6 is $$E = KV \frac{1}{\left(\frac{f_0}{f}\right)^2 - 1} \qquad (A)$$

wherein

V is the velocity imparted by the vibrating speech organ, to the casing portion 43 of the microphone, K is a numerical constant determined by the design of the microphone, $f_0$ is the resonant frequency of the vibratory microphone structure formed by the mass of the vibratory contact portion that is vibrated by the speech organ, the mass of the resiliently carried driven vibratory portion, and their resilient junction, and $f$ is the frequency of the vibrations imparted by the voice organ to the contact portion.

For frequencies sufficiently below resonance, $$\left(\frac{f_0}{f}\right)^2$$

is much greater than unity, and the equation (A) reduces to $$E = KV \left(\frac{f}{f_0}\right)^2 \qquad (B)$$

showing that for a given resonant frequency and constant velocity vibrations, the generated voltage rises as the square of the frequency; and that the ratio of the voltages generated at two frequencies, separated by an octave, of this range, expressed in decibels, is $$\log E_{2f}/E_f = 40 \log \frac{2f}{f} = 12 \text{ db.}$$

In an inertia reaction microphone using a vibratory energy translating structure, for instance, of piezo-electric material, in which the generated voltage is determined by the displacement of the resiliently carried vibratory portion relatively to the vibrated contact portion, the general equation of the generated voltage, corresponding to Equation A, is given by $$E = K \frac{V}{2\pi f} \frac{1}{\left(\frac{f_0}{f}\right)^2 - 1} = \frac{K}{2\pi} V \frac{1}{\left(\frac{f_0}{f}\right)^2 - 1} = KV \frac{1}{\left(\frac{f_0}{f}\right)^2 - 1} \qquad (A\text{-}1)$$

which in the region sufficiently below the resonant frequency reduces to $$E = KV \frac{f}{f^2_0} \qquad (B\text{-}1)$$

showing that in an inertia reaction displacement microphone, for a given resonant frequency, the generated voltage rises not as the square of the frequency, but only at the same rate as the frequency; and that the ratio of the voltages generated by constant velocity vibrations, at two frequencies, of this range, separated by an octave is only $$E_{2f}/E_f = 20 \log \frac{2f}{f} = 6 \text{ db.}$$

In Fig. 9 the function expressed by Equation A is plotted, for $KV=1$, on a logarithmic scale, for three values of the resonant frequency $f_0=.5$; $f_0=1$; and $f_0=2$, as curves S½, S and S2, respectively, to graphically illustrate the variations of the voltage generated by such inertia reaction velocity microphone as a function of the frequency when the microphone is subjected to vibrations of constant velocity.

Figure 10:
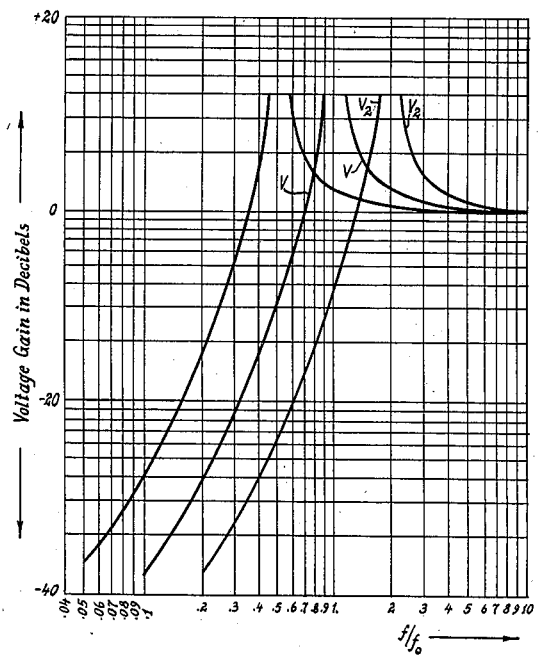
Fig. 10 shows curves explaining the operation of a microphone exemplifying the invention.
Figure 11:
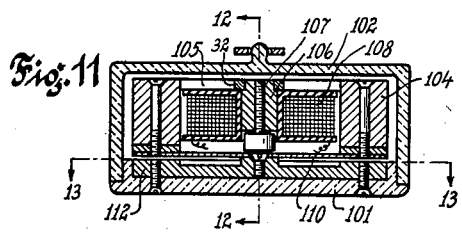
Figs. 11 to 13 are views similar to Figs. 4 to 6, respectively, illustrating a further exemplification of the invention.
Figure 12:
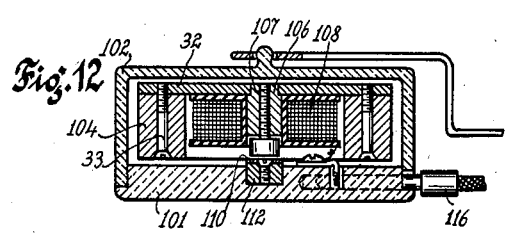
Figure 13:
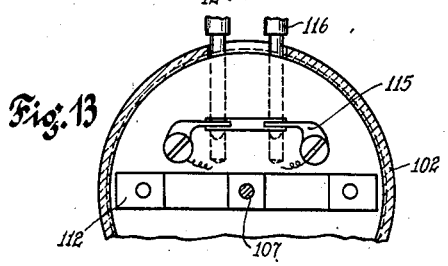
Figure 14:
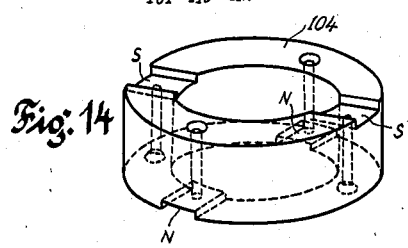
Fig. 14 is a perspective view of the permanent magnet member of the microphone of Figs. 11 to 13.

The foregoing analysis, and the curves of Fig. 10, show that the voltage generated by an inertia reaction velocity microphone rises with the frequency at the rate of about 12 db. per octave in the range up to about 60% of the resonant frequency, the rate of rise being higher in the range near the resonance frequency, and remaining at a high level in the range above the resonant frequency. Obviously, damping resistance makes possible keeping the rate of rise of the generated voltage at about 12 decibels per octave up to near the resonant frequency.

An inertia reaction microphone that is vibrated by a voice organ and in which the generated voltage is determined by the velocity imparted to the contact portion relatively to the resiliently carried vibratory mass portion that is driven by the contact portion, is thus able to discriminate in favor of the high frequencies by about 12 db. over one octave, about 24 db. over two octaves, about 36 db. over three octaves, and about 48 db. over four octaves of the speech frequency range.

The foregoing frequency discriminating characteristics of an inertia reaction velocity microphone make it possible to translate vibrations of a voice organ against which the contact portion of such microphone is held into electric oscillations which enable highly intelligible reproduction of speech with a standard substantially flat-response amplifier. This is probably due to the fact that, as the high frequency vibrations present in the speech waves emerge from the mouth, they react upon the voice organs, such as the vocal cords, the lips, and the body parts which form the cavities of the throat, nose and mouth, and impart thereto component high frequency vibrations, which, by the inertia reaction effects of their masses, discriminate against the high frequencies in a way analogous to the discrimination in favor of the high frequencies effected by the inertia reaction of the resiliently carried mass portion of the inertia reaction velocity microphone of the invention.

As distinguished therefrom, the voltage generated by an inertia reaction displacement microphone rises with the frequency at a much lower rate, and would require a special frequency discriminating network in order to secure the same degree of discrimination in favor of the high frequencies as obtained with an inertia reaction velocity microphone of the type described in connection with Figs. 4 to 6.

It is thus seen, that an inertia reaction velocity microphone of the invention will generate voltages which rise with the frequency at a rate greater than about 12 db. over two octaves, greater than about 18 db. over three octaves, and greater than about 24 db. over four octaves of the speech frequency range, and these operating characteristics make it possible to secure intelligible reproduction of speech when such microphone is actuated by a voice organ.

The actual design dimensions of an electromagnetic contact casing microphone of the type shown in Figs. 4 to 6 having a total mass of only about 20 grams, which proved successful in actual use, are as follows:

A resiliently carried magnet mass of about 12 grams; an armature diaphragm of about 0.8 gram having a resonance frequency of about 4000 cycles; a casing of about 8 grams; and the assembled resiliently carried vibrating system had a resonance frequency of about 1250 cycles. Such contact casing microphone made possible highly intelligible reproduction of speech when held in contact with the jaws, cheeks or the throat of the speaker. When intended for coupling to the cheeks of the speaker, highly intelligible reproduction will be obtained with such microphone structure having even a lower resonance frequency. However, since the resiliently carried vibrating structure is not exposed to interfering external forces, it may be readily designed to operate with higher resonance frequencies up to about 3000 cycles or even higher frequencies within the speech frequency range particularly when the vibrations are damped. Damping may be obtained by placing a damping liquid, such as oil, inside the microphone casing which may be designed with liquid tight joints.

Electromagnetic energy translating vibrating structures are particularly suitable for the construction of vibratory contact casing microphones of the invention. Since the main mass of the magnetic system is resiliently carried in a freely vibrating condition, its operation is free from interfering effects of external forces, and the effective magnetic flux gaps of the system may be made of the order of one thousandths of an inch and even less without danger of fringing. The small gap and the large magnetic forces acting in the gap make it possible to utilize very stiff resilient spring supports for the resiliently carried mass. It also makes it possible to utilize a large resiliently carried magnetic system while keeping the resonance frequency at a value at which a desirable response is obtained. In addition, the small gap makes possible the operation of the electromagnetic energy translating structure with very high flux densities and gives large variations of the flux density for small variations of the gap spacing. As a result, a very small contact casing microphone unit, having a very small total mass as low as 15 grams, or even less, which does not materially affect the vibrations of the speech organ against which it is held, is able to supply a relatively large output required for reproducing with a standard medium gain amplifier the spoken message with a high degree of intelligibility.

In Figs. 7 to 9 is shown a balanced electromagnetic contact casing microphone exemplifying the invention constructed similar to the device described in connection with Figs. 8 to 10 of my copending application Serial No. 697,673, filed November 11, 1933, now Patent Reissue 21,030. It comprises a sound proof rigid casing 70 having a base 71 and a strap clamp 63 mounted on the casing for coupling the microphone casing to a speech organ of a speaker. The casing is a part of a balanced electromagnetic vibratory structure formed of a magnetic core armature 72 having its opposite ends clamped to two base extensions 73 and a magnetic system resiliently carried on the magnetic diaphragm extensions 74. The magnetic system is formed of two core bars 75 having central pole pieces 76 threadedly held in core sleeves 77 which are secured to the core bars 76, and core blocks 78 held clamped by screws 80 between the core bars 76 and the opposite sides of the diaphragm extensions 74. The side wall portions of the casing 70 facing the base extensions 73, as shown in Figs. 8 and 9, have recesses which provide clearance for the base extensions.

The magnetic system has its core portions so magnetized that a permanent magnetic flux passes serially through one of the soft iron pole pieces 77 across the gap to the armature 72, and therefrom through the other gap to the other soft iron core pole piece 77 on the other side of the armature 72.

Each pole piece 77 is surrounded by an output coil 81 which is interlinked with the magnetic flux passing through the pole pieces and the two magnetic gaps serially arranged on the opposite sides of the armature 72. Terminal bushings 82 mounted in a terminal block extending from the base 71, provide terminal connections to the two serially connected coils 81. The two coils 81 are so connected that when, under the action of vibratory forces, the armature 72 moves from its neutral position and increases one gap while it decreases the other gap, the flux through one pole piece is decreased, and the flux in the other pole piece is increased, and these differential flux variations induce in the two coils 81 voltages which add to each other the differential flux returning through the magnetic diaphragm extensions 78.

Since the resiliently carried magnetic core system 75, 76, 77 and 80 has a large mass and exerts inertia reaction which rises with the frequency, the relative velocity between the armature 72 and the pole pieces 77, and rate of variations of the flux interlinked with the two coils 81 and the output voltage induced in the coils will rise with the frequency.

By using a balanced magnetic system even harmonic distortions are eliminated and objectionable saturation of the flux paths is avoided. In addition, such balanced electromagnetic contact casing microphones may be operated with smaller magnetic gaps, and greater efficiency.

In Figs. 11 to 14 is shown another electromagnetic contact casing microphone exemplifying the invention. It comprises a soundproof rigid casing consisting of a base 101 and a cover 102 threadedly attached to the base on which is mounted an electromagnetic vibrating structure with a resiliently carried magnet system. The magnet system comprises a ring-shaped permanent magnet core 104 carrying on a yoke 105 clamped in top grooves of the ring magnet an internally threaded hollow core sleeve 106 in which is mounted a pole piece 107 surrounded by an output coil 108. A resilient armature 110 has its two reinforced ends clamped within bottom grooves of the ring magnet 104, and the center portion of the armature spring 110 is clamped to an E-shaped magnetic shunt 112 which is affixed to the base 101 so as to resiliently carry the floating magnet system. The two end legs of the E-shaped shunt 112 are shorter than its center leg to which the armature 110 is clamped and form air gaps opposite the two ends of the armature. The lower end surface of the pole piece 107 and the center portion of the armature 110 form the main magnetic air gap of the vibrating structure which may be adjusted by turning the threaded pole piece 107.

The magnet core 104 is so magnetized as to produce a permanent magnetic flux passing through the pole piece 107 over the main magnetic gap to the center of the armature 110, and therefrom along parallel paths by way of the armature 110 and the shunt 112 to the bottom grooves of the ring magnet 104. The air gaps formed between the two outer legs of the E-shaped shunt core 112 and the ends of the armature 110 have a large cross section, presenting a relatively low reluctance to magnetic fluxes, thus avoiding a saturation of the armature 110. The two outer legs of the E-shaped shunt core 112 could be made narrow, and the cross section of the two outer air gaps as well as their length reduced so as to keep the flux density through these air gaps at the same value as the flux density in the main air gap.

The two ends of coil 108 are connected to two terminal contacts 115 fastened to the base 101 for engaging two terminal plugs 116 of cord leads 32 to the amplifier. Such contact casing microphone may be provided with a swivel protrusion 117 shaped for engagement with a hole of a resilient head band 31 which holds the microphone casing in contact with the upper jaw of the speaker in the way shown in Fig. 1 so as to vibrate in unison with the vibrations of the jaw. Since the resiliently carried magnet mass resists the motion of the vibratory casing 102, it moves with a greatly reduced velocity. There is thus produced a resultant velocity between the casing and the resiliently carried magnetic mass, and periodical changes in the width of the air gap. The variation of the width of one or all three air gaps causes corresponding fluctuations in the amount of the total flux interlinked with the coil 108. These flux fluctuations induce in the output coil 108 voltages proportional to the relative velocity between the casing and the mass resiliently carried within the casing.

The design of the microphone of the present invention is very efficient. As a result, the vibrations of the speech organ generate in the output coil 108 relatively large output voltages. On account of the relatively large output of the microphone, a moderate gain amplifier having only two or three stages of amplification will deliver enough power to modulate an aeroplane radio transmitter. The internal impedance of the microphone is very small, only a few ohms, and therefore such microphone may be coupled to the first amplifier stage by means of a high ratio step-up transformer, for example, 1 to 50 or 1 to 100, without requiring extensive shielding to prevent interference by external stray fields.

The microphone of the invention shown in Figs. 11 to 14 is very small and light. Its casing is less than 3/4" in diameter, and less than 3/8" thick. It weights only about 16 grams. When placed inside of the mouth of the speaker, in the cavity between the lower jaw and the cheek, it is kept there with the same comfort as a piece of chewing gum. To protect it from the moisture, the casing may be easily made moisture proof.

In Figs. 15 to 17 is shown another construction of an electromagnetic contact casing microphone exemplifying the invention. It comprises a casing driven by a speech organ having a base 120 and a casing cap 121 enclosing an electromagnetic vibrating structure with a resiliently carried magnetic system. The magnetic system comprises a ring magnet 122 in which are fastened two internally threaded core sleeves 123 holding two core pole pieces 124. The pole pieces 124 of the magnetic system form two magnetic gaps with the end portions of an armature core 125 surrounded by an output coil 126 and clamped to the base by screws 127. The output coil is connected to terminal contacts 128.

The ring magnet 122 is resiliently carried by two semi-circular springs 130 shown in Fig. 17. To one end of each spring 130 is soldered an angle piece 131 which is held clamped to the base by the clamped end portion of the armature 121. The other end of each spring 130 is provided with a hole fitting around the opposite core pole piece 124 and is affixed to its core sleeve 123 as by soldering. The threaded mounting of the pole pieces 124 enables adjustment of the magnetic gaps to a gap distance of the order of one thousandth of an inch or less. The two springs 130 are made out of elastic non-magnetic material, such as, of phosphor bronze.

The ring magnet is permanently magnetized to produce opposite polarities at the pole pieces 182, and pass a magnetic flux, which traverses the two magnetic gaps and the armature 125. This arrangement of the magnetic core system provides a magnetic flux path including the armature 125, the two air gaps, the pole pieces 124, and the two halves of the ring magnet 122, which has throughout its length a substantial cross section, offering a small magnetic reluctance to flux variations produced by the vibrations of the armature across the air gaps which separate it from the magnet system.

A disc 132 of brass or copper pressed into the ring magnet 122 augments the effective floating mass. In addition, it is provided with one or more small holes 133 which serve to produce viscous damping during the motion of the resiliently carried mass in the surrounding air for improving the response of the microphone in its high frequency range. The damping action may be increased by filling the casing with oil.

The microphone of Figs. 15 to 17 is likewise very small, compact and efficient. Such microphone having a mass of about 16 grams, an outer diameter of about ¾", and a thickness of ¼", held in contact with vibrating portions of the cheeks, jaws or the throat supplies in actual use a relatively large voltage output having a rising frequency characteristic which made possible reproduction of the speech emerging from the mouth of the speaker with a high degree of intelligibility while using only a moderate gain, compact amplifier.

Although the contact casing microphone of the type shown in Figs. 4 to 6 is operated satisfactorily with a compliant spring arrangement having a resonance frequency of about 4000 cycles, contact casing microphones of the type shown in Figs. 4 to 27 will give satisfactory operation when the compliant element of the enclosed vibratory structure is designed to have a resonance frequency between about 2000 to 8000 cycles.

Although contact casing microphones of the type shown in Figs. 4 to 6 are operated satisfactorily with a composite vibratory structure having a resonance frequency of about 1250 cycles, contact casing microphones of the type shown in Figs. 4 to 27 will give satisfactory operation when its composite vibratory structure is designed to have a resonance frequency between about 1100 to 300 cycles, or even up to 6000 cycles, if the vibratory motion of the enclosed resiliently carried vibratory mass is dampened.

With such arrangements it is possible to secure satisfactory operation by designing the resiliently carried vibratory portion so that its mass is about 1.2 times as large as the casing portion.

The features of the invention are not limited to the specific details of construction design referred to in describing the various exemplifications of the invention, and many modifications thereof will suggest themselves to those skilled in the art. It is accordingly desired that the appended claims be given a broad interpretation commensurate with the scope of the invention within the art.

I claim:

1. In an apparatus for translating into electrical oscillations required for intelligible reproduction of the normal speech the vibrations of a speech organ which differ in character from the component vibrations present in the normal speech transmitted from the mouth through the air, a microphone unit constituting an elastically deformable energy translating vibratory structure designed and arranged to be held against a vibrating speech organ and to have an overall mass sufficiently small to prevent substantial modification of the component vibrations of said organ required for intelligible reproduction of said speech; said microphone unit comprising: a driven vibratory portion having a relatively substantial mass and a driving vibratory contact portion arranged to be held coupled in contact with said organ so as to be vibrated thereby and having a resilient junction carrying said driven vibratory portion in a relatively freely vibrating condition; the elements of said vibrating structure forming parts of a magnetic core structure having a gap and windings interlinked with the magnetic flux of said core and arranged to generate in said windings oscillations substantially proportional to the relative velocity between said resiliently carried portion and said contact portion when it is subjected to vibrations of a substantial part of the principal speech frequency range extending below the resonance frequency of said vibrating structure; the masses of said vibratory portions and the stiffness of their resilient junction being designed and arranged to form a vibratory system having a resonance frequency at which it generates under constant velocity vibrations imparted to the contact portion a voltage which rises with the frequency at a rate of at least about seven decibels per octave over at least one octave in a part of the frequency range up to about 3000 cycles per second so that the oscillations generated in said windings when the contact portion is vibrated by said speech organ have frequency characteristics substantially similar to those of speech transmitted through the air.

2. In an apparatus for translating into electrical oscillations required for intelligible reproduction of normal speech the vibrations of a speech organ which differ in character from the component vibrations present in the normal speech transmitted from the mouth through the air, a microphone unit constituting an elastically deformable energy translating vibratory structure designed and arranged to be held against a vibrating speech organ and to have an overall mass sufficiently small to prevent substantial modification of the component vibrations of said organ required for intelligible reproduction of said speech; said microphone unit comprising: a driven vibratory portion having a relatively substantial mass and a driving vibratory contact portion arranged to be held coupled in contact with said organ so as to be vibrated thereby and having a resilient junction carrying said driven vibratory portion in a vibrating condition; the elements of said vibrating structure forming parts of a magnetic core structure having a gap and windings interlinked with the magnetic flux of said core and arranged to generate in said windings oscillations substantially proportional to the relative velocity between said resiliently carried portion and said contact portion when it is subjected to vibrations of a substantial part of the principal speech frequency range extending below the resonance frequency of said vibrating structure; the masses of said vibratory portions and the stiffness of their resilient junction being designed and arranged to form a vibratory system having a resonance frequency at which it generates under constant velocity vibrations imparted to the contact portion a voltage which rises with the frequency at a rate of at least about seven decibels per octave over at least two octaves in a part of the frequency range up to about 3500 cycles per second so that the oscillations generated in said windings when the contact portion is vibrated by said speech organ have frequency characteristics substantially similar to those of speech transmitted through the air.

3. In an apparatus for translating into electrical oscillations required for intelligible reproduction of normal speech the vibrations of a speech organ which differ in character from the component vibrations present in the normal speech transmitted from the mouth through the air, a microphone unit constituting an elastically deformable energy translating vibratory structure designed and arranged to be held against a vibrating speech organ and to have an overall mass sufficiently small to prevent substantial modification of the component vibrations of said organ required for intelligible reproduction of said speech; said microphone unit comprising: a driven vibratory portion having a relatively substantial mass and a driving vibratory contact portion arranged to be held coupled in contact with said organ so as to be vibrated thereby and having a resilient junction carrying said driven vibratory portion in a relatively freely vibrating condition; the elements of said vibrating structure forming parts of a magnetic core structure having a gap and windings interlinked with the magnetic flux of said core and arranged to generate in said windings oscillations substantially proportional to the relative velocity between said resiliently carried portion and said contact portion when it is subjected to vibrations of a substantial part of the principal speech frequency range extending below the resonance frequency of said vibrating structure; the masses of said vibratory portions and the stiffness of their resilient junction being designed and arranged to form a vibratory system having a resonance frequency at which it generates under constant velocity vibrations imparted to the contact portion a voltage which rises with the frequency at a rate of at least about seven decibels per octave over at least three octaves in a part of the frequency range up to about 4000 cycles per second so that the oscillations generated in said windings when the contact portion is vibrated by said speech organ have frequency characteristics substantially similar to those of speech transmitted through the air.

4. In an apparatus for translating into electrical oscillations required for intelligible reproduction of the human speech the vibrations of a speech organ which differ in character from the component vibrations present in the speech emanating from the mouth and transmitted through the air, a microphone unit designed and arranged to be carried by the vibrating speech organ and to have an overall mass sufficiently small to prevent substantial modification of the component vibrations of said organ required for intelligible reproduction of said speech, comprising: a driven vibratory portion having a mass greater than about three grams; and a driving vibratory contact portion arranged to be held coupled in contact with said organ so as to be vibrated thereby and having a resilient junction carrying said driven vibratory portion in a vibrating condition; the elements of said vibrating structure forming parts of a magnetic core structure having a gap and windings interlinked with the magnetic flux of said core and arranged to generate in said windings oscillations substantially proportional to the relative velocity between said resiliently carried portion and said contact portion when it is subjected to vibrations of a substantial part of the principal speech frequency range extending below the resonance frequency of said vibrating structure, said windings forming a part of said resiliently carried portion; the masses of said vibratory portions and the stiffness of their resilient junction being designed and arranged to form a vibratory system having a resonance frequency at which it generates under constant velocity vibrations imparted to the contact portion a voltage which rises with the frequency at a rate of at least about seven decibels per octave over at least two octaves in a part of the frequency range up to about 3500 cycles per second so that the oscillations generated in said windings when the contact portion is vibrated by said speech organ have frequency characteristics substantially similar to those of speech transmitted through the air.

5. In an apparatus for translating into electrical oscillations required for intelligible reproduction of the human speech the vibrations of a speech organ which differ in character from the component vibrations present in the speech emanating from the mouth and transmitted through the air, a microphone unit designed and arranged to be carried by the vibrating speech organ and to have an overall mass sufficiently small to prevent substantial modification of the component vibrations of said organ required for intelligible reproduction of said speech, comprising: a driven vibratory portion having a mass greater than about four grams; and a driving vibratory contact portion arranged to be held coupled in contact with said organ so as to be vibrated thereby and having a resilient junction carrying said driven vibratory portion in a vibrating condition; the elements of said vibrating structure forming parts of a magnetic core structure having a gap and windings interlinked with the magnetic flux of said core and arranged to generate in said windings oscillations substantially proportional to the relative velocity between said resiliently carried portion and said contact portion when it is subjected to vibrations of a substantial part of the principal speech frequency range extending below the resonance frequency of said vibrating structure; the masses of said vibratory portions and the stiffness of their resilient junction being designed and arranged to form a vibratory system having a resonance frequency at which it generates under constant velocity vibrations imparted to the contact portion a voltage which rises with the frequency at a rate of at least about nine decibels per octave over at least one octave in a part of the frequency range up to about 3000 cycles per second so that the oscillations generated in said windings when the contact portion is vibrated by said speech organ have frequency characteristics substantially similar to those of speech transmitted through the air.

6. In an apparatus for translating into electrical oscillations required for intelligible reproduction of the human speech the vibrations of a speech organ which differ in character from the component vibrations present in the speech emanating from the mouth and transmitted through the air, a microphone unit designed and arranged to be carried by the vibrating speech organ and to have an overall mass sufficiently small to prevent substantial modification of the component vibrations of said organ required for intelligible reproduction of said speech, comprising: a driven vibratory portion having a mass greater than about four grams; and a driving vibratory contact portion arranged to be held coupled in contact with said organ so as to be vibrated thereby and having a resilient junction carrying said driven vibratory portion in a vibrating condition; the elements of said vibrating structure forming parts of a magnetic core structure having a gap and windings interlinked with the magnetic flux of said core and arranged to generate in said windings oscillations substantially proportional to the relative velocity between said resiliently carried portion and said contact portion when it is subjected to vibrations of a substantial part of the principal speech frequency range extending below the resonance frequency of said vibrating structure, said windings forming a part of said resiliently carried portion; the masses of said vibratory portions and the stiffness of their resilient junction being designed and arranged to form a vibratory system having a resonance frequency at which it generates under constant velocity vibrations imparted to the contact portion a voltage which rises with the frequency at a rate of at least about nine decibels per octave over at least two octaves in a part of the frequency range up to about 3500 cycles per second so that the oscillations generated in said windings when the contact portion is vibrated by said speech organ have frequency characteristics substantially similar to those of speech transmitted through the air.

7. In an apparatus for translating into electrical oscillations required for intelligible reproduction of the human speech the vibrations of a speech organ which differ in character from the component vibrations present in the speech emanating from the mouth and transmitted through the air, a microphone unit designed and arranged to be carried by the vibrating speech organ and to have an overall mass sufficiently small to prevent substantial modification of the component vibrations of said organ required for intelligible reproduction of said speech, comprising: a driven vibratory portion having a mass greater than about eight grams; and a driving vibratory contact portion arranged to be held coupled in contact with said organ so as to be vibrated thereby and having a resilient junction carrying said driven vibratory portion in a vibrating condition; the elements of said vibrating structure forming parts of a magnetic core structure having a gap and windings interlinked with the magnetic flux of said core and arranged to generate in said windings oscillations substantially proportional to the relative velocity between said resiliently carried portion and said contact portion when it is subjected to vibrations of a substantial part of the principal speech frequency range extending below the resonance frequency of said vibrating structure; the masses of said vibratory portions and the stiffness of their resilient junction being designed and arranged to form a vibratory system having a resonance frequency at which it generates under constant velocity vibrations imparted to the contact portion a voltage which rises with the frequency at a rate of at least about nine decibels per octave over at least three octaves in a part of the frequency range up to about 4000 cycles per second so that the oscillations generated in said windings when the contact portion is vibrated by said speech organ have frequency characteristics substantially similar to those of speech transmitted through the air.

8. In an apparatus for translating into electrical oscillations required for intelligible reproduction of the human speech the vibrations of a speech organ which differ in character from the component vibrations present in the speech emanating from the mouth and transmitted through the air, a microphone unit designed and arranged to be carried by the vibrating speech organ and to have an overall mass sufficiently small to prevent substantial modification of the component vibrations of said organ required for intelligible reproduction of said speech, comprising: a driven vibratory portion having a mass greater than about four grams; and a driving vibratory contact portion arranged to be held coupled in contact with said organ so as to be vibrated thereby and having a resilient junction carrying said driven vibratory portion in a vibrating condition; the elements of said vibrating structure forming parts of a magnetic core structure having a gap and windings interlinked with the magnetic flux of said core and arranged to generate in said windings oscillations substantially proportional to the relative velocity between said resiliently carried portion and said contact portion when it is subjected to vibrations of a substantial part of the principal speech frequency range extending below the resonance frequency of said vibrating structure, said windings forming a part of said resiliently carried portion; the masses of said vibratory portions and the stiffness of their resilient junction being designed and arranged to form a vibratory system having a resonance frequency at which it generates under constant velocity vibrations imparted to the contact portion a voltage which rises with the frequency at a rate of at least about seven decibels per octave over at least one octave in a part of the frequency range up to about 3000 cycles per second so that the oscillations generated in said windings when the contact portion is vibrated by said speech organ have frequency characteristics substantially similar to those of speech transmitted through the air, said contact portion forming a part of a casing enclosing the resiliently carried portion and preventing the microphone unit from responding to speech vibrations transmitted through the air.

9. In an apparatus for translating into electrical oscillations required for intelligible reproduction of the human speech the vibrations of a speech organ which differ in character from the component vibrations present in the speech emanating from the mouth and transmitted through the air, a microphone unit designed and arranged to be carried by the vibrating speech organ and to have an overall mass sufficiently small to prevent substantial modification of the component vibrations of said organ required for intelligible reproduction of said speech, comprising: a driven vibratory portion having a mass greater than about three grams; and a driving vibratory contact portion arranged to be held coupled in contact with said organ so as to be vibrated thereby and having a resilient junction carrying said driven vibratory portion in a vibrating condition; the elements of said vibrating structure forming parts of a magnetic core structure having a gap and windings interlinked with the magnetic flux of said core and arranged to generate in said windings oscillations substantially proportional to the relative velocity between said resiliently carried portion and said contact portion when it is subjected to vibrations of a substantial part of the principal speech frequency range extending below the resonance frequency of said vibrating structure; the masses of said vibratory portions and the stiffness of their resilient junction being designed and arranged to form a vibratory system having a resonance frequency at which it generates under constant velocity vibrations imparted to the contact portion a voltage which rises with the frequency at a rate of at least about seven decibels per octave over at least two octaves in a part of the frequency range up to about 3500 cycles per second so that the oscillations generated in said windings when the contact portion is vibrated by said speech organ have frequency characteristics substantially similar to those of speech transmitted through the air, said contact portion forming a part of a casing enclosing the resiliently carried portion and preventing the microphone unit from responding to speech vibrations transmitted through the air.

10. In an apparatus for translating into electrical oscillations required for intelligible reproduction of the human speech the vibrations of a speech organ which differ in character from the component vibrations present in the speech emanating from the mouth and transmitted through the air, a microphone unit designed and arranged to be carried by the vibrating speech organ and to have an overall mass sufficiently small to prevent substantial modification of the component vibrations of said organ required for intelligible reproduction of said speech, comprising: a driven vibratory portion having a mass greater than about three grams; and a driving vibratory contact portion arranged to be held coupled in contact with said organ so as to be vibrated thereby and having a resilient junction carrying said driven vibratory portion in a vibrating condition; the elements of said vibrating structure forming parts of a magnetic core structure having a gap and windings interlinked with the magnetic flux of said core and arranged to generate in said windings oscillations substantially proportional to the relative velocity between said resiliently carried portion and said contact portion when it is subjected to vibrations of a substantial part of the principal speech frequency range extending below the resonance frequency of said vibrating structure; the masses of said vibratory portions and the stiffness of their resilient junction being designed and arranged to form a vibratory system having a resonance frequency at which it generates under constant velocity vibrations imparted to the contact portion a voltage which rises with the frequency at a rate of at least about seven decibels per octave over at least three octaves in a part of the frequency range up to about 4000 cycles per second so that the oscillations generated in said windings when the contact portion is vibrated by said speech organ have frequency characteristics substantially similar to those of speech transmitted through the air, said contact portion forming a part of a casing enclosing the resiliently carried portion and preventing the microphone unit from responding to speech vibrations transmitted through the air.

11. In an apparatus for translating into electrical oscillations required for intelligible reproduction of the human speech the vibrations of a speech organ which differ in character from the component vibrations present in the speech emanating from the mouth and transmitted through the air, a microphone unit designed and arranged to be carried by the vibrating speech organ and to have an overall mass sufficiently small to prevent substantial modification of the component vibrations of said organ required for intelligible reproduction of said speech, comprising: a driven vibratory portion having a mass greater than about four grams; and a driving vibratory contact portion arranged to be held coupled in contact with said organ so as to be vibrated thereby and having a resilient junction carrying said driven vibratory portion in a vibrating condition; the elements of said vibrating structure forming parts of a magnetic core structure having a gap and windings interlinked with the magnetic flux of said core and arranged to generate in said windings oscillations substantially proportional to the relative velocity between said resiliently carried portion and said contact portion when it is subjected to vibrations of a substantial part of the principal speech frequency range extending below the resonance frequency of said vibrating structure, said windings forming a part of said resiliently carried portion; the masses of said vibratory portions and the stiffness of their resilient junction being designed and arranged to form a vibratory system having a resonance frequency at which it generates under constant velocity vibrations imparted to the contact portion a voltage which rises with the frequency at a rate of at least about nine decibels per octave over at least one octave in a part of the frequency range up to about 3000 cycles per second so that the oscillations generated in said windings when the contact portion is vibrated by said speech organ have frequency characteristics substantially similar to those of speech transmitted through the air, said contact portion forming a part of a casing enclosing the resiliently carried portion and preventing the microphone unit from responding to speech vibrations transmitted through the air.

12. In an apparatus for translating into electrical oscillations required for intelligible reproduction of the human speech the vibrations of a speech organ which differ in character from the component vibrations present in the speech emanating from the mouth and transmitted through the air, a microphone unit designed and arranged to be carried by the vibrating speech organ and to have an overall mass sufficiently small to prevent substantial modification of the component vibrations of said organ required for intelligible reproduction of said speech, comprising: a driven vibratory portion having a mass greater than about four grams; and a driving vibratory contact portion arranged to be held coupled in contact with said organ so as to be vibrated thereby and having a resilient junction carrying said driven vibratory portion in a vibrating condition; the elements of said vibrating structure forming parts of a magnetic core structure having a gap and windings interlinked with the magnetic flux of said core and arranged to generate in said windings oscillations substantially proportional to the relative velocity between said resiliently carried portion and said contact portion when it is subjected to vibrations of a substantial part of the principal speech frequency range extending below the resonance frequency of said vibrating structure; the masses of said vibratory portions and the stiffness of their resilient junction being designed and arranged to form a vibratory system having a resonance frequency at which it generates under constant velocity vibrations imparted to the contact portion a voltage which rises with the frequency at a rate of at least about nine decibels per octave over at least two octaves in a part of the frequency range up to about 3500 cycles per second so that the oscillations generated in said windings when the contact portion is vibrated by said speech organ have frequency characteristics substantially similar to those of speech transmitted through the air, said contact portion forming a part of a casing enclosing the resiliently carried portion and preventing the microphone unit from responding to speech vibrations transmitted through the air.

13. In an apparatus for translating into electrical oscillations required for intelligible reproduction of the human speech the vibrations of a speech organ which differ in character from the component vibrations present in the speech emanating from the mouth and transmitted through the air, a microphone unit designed and arranged to be carried by the vibrating speech organ and to have an overall mass sufficiently small to prevent substantial modification of the component vibrations of said organ required for intelligible reproduction of said speech, comprising: a driven vibratory portion having a mass greater than about four grams; and a driving vibratory contact portion arranged to be held coupled in contact with said organ so as to be vibrated thereby and having a resilient junction carrying said driven vibratory portion in a vibrating condition; the elements of said vibrating structure forming parts of a magnetic core structure having a gap and windings interlinked with the magnetic flux of said core and arranged to generate in said windings oscillations substantially proportional to the relative velocity between said resiliently carried portion and said contact portion when it is subjected to vibrations of a substantial part of the principal speech frequency range extending below the resonance frequency of said vibrating structure; the masses of said vibratory portions and the stiffness of their resilient junction being designed and arranged to form a vibratory system having a resonance frequency at which it generates under constant velocity vibrations imparted to the contact portion a voltage which rises with the frequency at a rate of at least about nine decibels per octave over at least three octaves in a part of the frequency range up to about 4000 cycles per second so that the oscillations generated in said windings when the contact portion is vibrated by said speech organ have frequency characteristics substantially similar to those of speech transmitted through the air, said contact portion forming a part of a casing enclosing the resiliently carried portion and preventing the microphone unit from responding to speech vibrations transmitted through the air.

EMIL H. GREIBACH.